United States Patent
Lamping et al.

(10) Patent No.: US 6,733,605 B1
(45) Date of Patent: May 11, 2004

(54) METHOD AND APPARATUS FOR FRICTION BONDING PORTIONS OF PLURAL WORKPIECE LAYERS

(75) Inventors: Michael J. Lamping, Cincinnati, OH (US); Bryan A. Robertson, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/325,305

(22) Filed: Dec. 20, 2002

(51) Int. Cl.[7] ............................................... B29C 65/06
(52) U.S. Cl. ........................ 156/64; 156/73.5; 156/358; 156/555; 156/580
(58) Field of Search ......................... 156/64, 73.5, 290, 156/308.2, 308.4, 358, 553, 555, 580, 582; 264/68

(56) References Cited

U.S. PATENT DOCUMENTS

| | | | |
|---|---|---|---|
| 4,721,788 A | * | 1/1988 | Yamauchi et al. .......... 546/246 |
| 4,812,722 A | | 3/1989 | Corrothers |
| 4,854,984 A | | 8/1989 | Ball et al. |
| 4,919,738 A | | 4/1990 | Ball et al. |
| 4,957,580 A | | 9/1990 | Drexler et al. |
| 5,386,092 A | | 1/1995 | Dufrenne |
| 5,527,416 A | | 6/1996 | Traise |
| 5,609,702 A | | 3/1997 | Andersen |
| 5,827,384 A | | 10/1998 | Canfield et al. |
| 5,944,946 A | | 8/1999 | Downing et al. |
| 6,101,912 A | | 8/2000 | Sanders et al. |
| 6,145,563 A | | 11/2000 | Kalisiak et al. |
| 6,248,195 B1 | | 6/2001 | Schmitz |
| 6,264,872 B1 | | 7/2001 | Majors et al. |
| 6,296,726 B1 | * | 10/2001 | Pencak .......................... 156/64 |
| 6,354,482 B1 | | 3/2002 | Diebold et al. |
| 6,364,977 B1 | * | 4/2002 | Simon .......................... 156/64 |
| 6,418,828 B1 | | 7/2002 | Kalnitz |

* cited by examiner

Primary Examiner—James Sells
(74) Attorney, Agent, or Firm—Jay A. Krebs; Ken K. Patel; Steven W. Miller

(57) ABSTRACT

A method and apparatus are provide for dynamically bonding plural workpiece layers together. The apparatus comprises: a first assembly including a rotatable element having an outer circumferential portion adapted to engage one of the workpiece layers; a second assembly including an anvil roll adapted to engage another of the workpiece layers and defining with the rotatable element a nip for receiving the workpiece layers; a drive mechanism for effecting rotation of the rotatable element and the anvil roll; and servo motor apparatus for applying a predefined force to at least one of the rotatable element and the anvil roll so as to bias the rotatable element and the anvil roll together. Further provided is a control system coupled to the servo motor apparatus for varying the force applied by the servo motor apparatus to the at least one of the rotatable element and the anvil roll such that the outer circumferential portion of the rotatable element and the anvil roll engage and bond together predefined portions of the plural workpiece layers passing through the nip.

20 Claims, 3 Drawing Sheets

METHOD AND APPARATUS FOR FRICTION BONDING PORTIONS OF PLURAL WORKPIECE LAYERS

BACKGROUND OF THE INVENTION

U.S. Pat. Nos. 4,854,984 and 4,919,738 disclose a bonding apparatus for bonding portions of plural workpiece layers together, wherein at least one of the workpiece layers comprises a thermoplastic layer. The apparatus comprises a patterned cylinder 22, an anvil cylinder 24, and means 26 for adjustably biasing the cylinders 22 and 24 together. The patterned cylinder 22 is provided with a "saw-tooth shape pattern of protuberances 51 which extend circumferentially about each end of the cylinder," see column 4, lines 65–67 of the '984 patent. The biasing means 26 comprises pressure regulating means 55 and a pneumatic actuator means 56. The pressure regulating means 55 is coupled to a supply source P of pressurized air and to the pneumatic actuator means 56 and controls the pressure applied by the pneumatic actuator means 56 to the cylinders 22 and 24. Neither the '984 patent nor the '738 patent discloses means for adjustably forming discrete lengths of bonded portions within the workpiece layers.

It is also known to bond portions of plural workpiece layers using an apparatus similar to the one disclosed in the '984 patent where, in place of a patterned cylinder, a support roll, a mounting ring coupled to the support roll and a patterned tool coupled to the mounting ring, are provided. Cams are also provided on the support roll. They engage an anvil cylinder and define when the patterned tool and anvil cylinder come together so as to apply sufficient compressive forces to workpiece layers passing therebetween to bond desired, discrete portions of the workpiece layers. For example, plural workpiece layers may include a plurality of sequential workpiece sections, wherein each workpiece section is bonded to include at least one bonded portion. Further, center points on sequential workpiece sections are separated from one another by a predefined pitch. In order to vary one or more of the length of a bonded portion and the workpiece section pitch, modified cams and a modified patterned tool are typically provided.

Accordingly, there is a need for a bonding apparatus, wherein the lengths of the bonded portions and workpiece section pitch can be varied without requiring the installation of modified tooling and cams.

BRIEF SUMMARY OF THE INVENTION

An apparatus is provided for dynamically bonding plural workpiece layers together. The apparatus comprises: a first assembly including a rotatable element having an outer circumferential portion adapted to engage one of the workpiece layers; a second assembly including an anvil roll adapted to engage another of the workpiece layers and defining with the rotatable element a nip for receiving the workpiece layers; a drive mechanism for effecting rotation of the rotatable element and the anvil roll; servo motor apparatus for applying a predefined force to at least one of the rotatable element and the anvil roll so as to bias the rotatable element and the anvil roll together; and a control system coupled to the servo motor apparatus for varying the force applied by the servo motor to the at least one of the rotatable element and the anvil roll such that the outer circumferential portion of the rotatable element and the anvil roll engage and bond together predefined portions of the plural workpiece layers passing through the nip.

DETAILED DESCRIPTION OF THE INVENTION

Figures 1, 2:
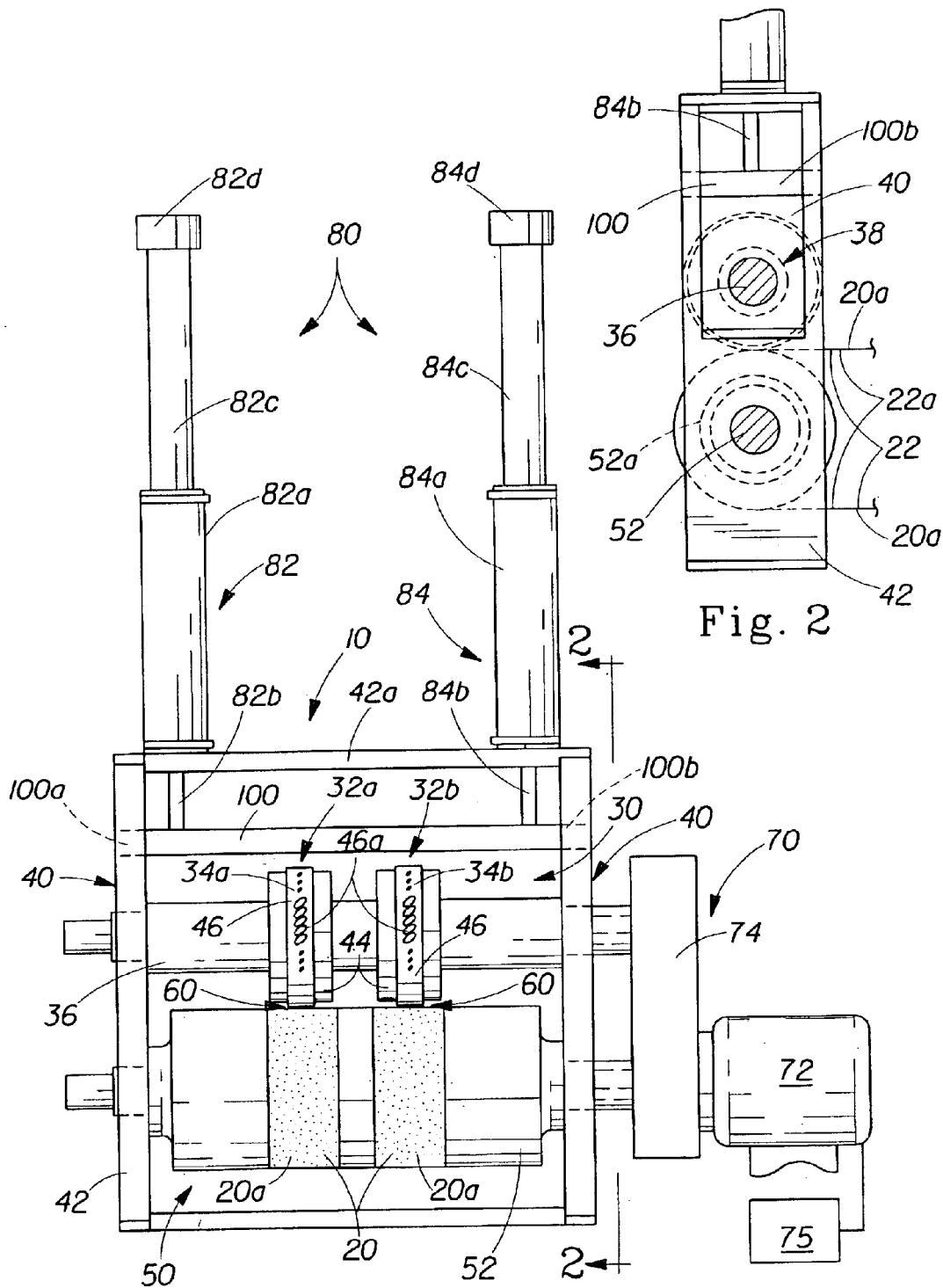
FIG. 1 is a front view of a friction bonding apparatus.
FIG. 2 is a view taken along view line 2—2 in FIG. 1.

An apparatus 10 constructed in accordance with the present invention for friction bonding first and second workpiece layers 20 and 22 together is illustrated in FIGS. 1 and 2. The apparatus 10 comprises a first assembly 30 including first and second rotatable elements 32a and 32b, each having an outer circumferential portion 34a, 34b adapted to engage an upper surface 20a of a corresponding first workpiece layer 20. Also provided is a second assembly 50 including an anvil roll 52 adapted to engage a lower surface 22a of the second workpiece layer 22. Each outer circumferential portion 34a, 34b and the anvil roll 52 define a nip 60 for receiving corresponding first and second workpiece layers 20 and 22. It is contemplated that one or more additional workpiece layers (not shown) may be provided in combination with each set of first and second layers 20 and 22. Preferably, at least one workpiece layer comprises a thermoplastic film, which film is capable of being friction bonded to one or more adjacent workpiece layers. The remaining workpiece layer(s) may also comprise a thermoplastic film, or comprise a paper or similar web of material. The films or webs may be fed into the nips 60 from rolls of material (not shown).

The rotatable elements 32a, 32b are mounted to a support roll 36 for rotation with the support roll 36. The support roll 36 is mounted in bearings 38, which, in turn, are mounted in movable bearing plates 40 such that the support roll 36 and the bearings 38 move with the bearing plates 40. The bearing plates 40 are mounted in a fixed housing 42 for movement relative to the fixed housing 42. The anvil roll 52 is mounted in bearings 52a, which, in turn, are fixedly mounted in the housing 42. It is contemplated that the anvil roll 52 may be mounted in the bearings 38 so as to move relative to the fixed housing 42 while the support roll 36 is mounted in the bearings 52a so as to be fixed within the housing 42.

Each rotatable element 32a, 32b comprises a mounting ring 44 coupled to the support roll 36 such as by bolts (not shown) for rotation with the support roll 36 and a patterned tool 46 coupled to the mounting ring 44 such as by bolts (not shown) for rotation with the mounting ring 44. Each patterned tool 46 defines the outer circumferential portion 34a, 34b of the corresponding rotatable element 32a, 32b and includes a plurality of outwardly extending protuberances 46a. Each protuberance 46a is capable of generating a bond site on the first and second workpiece layers 20 and 22 when sufficient pressure is applied by the protuberance 46a and the anvil roll 52 to the workpiece layers 20 and 22. Bonding is effected in the absence of adhesive due to the pressure applied to the workpiece layers 20 and 22 by each protuberance 46 and the anvil roll 52. Bonded portions of the workpiece layers 20 and 22 are defined by a plurality of sequentially formed bond sites.

A drive mechanism 70 is provided for effecting rotation of the support roll 36 and the anvil roll 52. The drive mechanism 70 comprises a motor 72 coupled to conventional gearing apparatus 74, which, in turn, is coupled to the support roll 36 and the anvil roll 52 to effect rotation of both rolls 36 and 52. The rolls 36 and 52 may be rotated at substantially the same speed or at different speeds, as discussed in U.S. Pat. Nos. 4,854,984 and 4,919,738, the disclosures of which patents are incorporated herein by reference. The operation and, hence, the speed of the motor 72 is controlled via a motor controller 75. It is also contemplated that separate motors may be provided for each of the support roll 36 and the anvil roll 52.

A linear servo motor apparatus 80 is provided for applying predefined forces to the rotatable elements 32a 32b so as to pressure bias the rotatable elements 32a and 32b and the anvil roll 52 together. Also provided is a control system 90, see FIG. 3, coupled to the servo motor apparatus 80 for varying the forces applied by the servo motor apparatus 80 to the rotatable elements 32a, 32b such that the outer circumferential portions 34a, 34b of the rotatable elements 32a, 32b and the anvil roll 52 bond together predefined portions of the first and second workpiece layers 20 and 22 passing through the nips 60.

In the illustrated embodiment, the servo motor apparatus 80 comprises first and second linear servo motors 82 and 84. The motors 82 and 84 are commercially available from California Linear Device of Carlsbad, Calif. under the product designation "Model No. 5020-6," see htt:// www.calinear.com/50206bds.html. The motors 82 and 84 comprise cylinder portions 82a, 84a and pistons 82b, 84b extending from the cylinder portions 82a, 84a. Shrouds 82c, 84c are coupled to the cylinder portions 82a, 84a to protect the pistons 82b, 84b when retracted. The cylinder portions 82a, 84a are fixedly coupled to a fixed upper plate 42a of the fixed housing 42. The pistons 82b, 84b extend through openings provided in the upper plate 42a so as to engage and apply corresponding forces to a movable force transfer plate 100. In the illustrated embodiment, each linear motor 82 and 84 is capable of generating up to approximately 1125 pounds of peak force upon the force transfer plate 100. The force transfer plate 100, in turn, transfers those forces via its outer ends 100a and 100b to the two bearing plates 40. Hence, forces applied by the motor pistons 82b, 84b to the force transfer plate 100 are transferred by the plate 100 to the bearing plates 40 such that the rotatable elements 32a, 32b and the anvil roll 52 are pressure biased together. It is also contemplated that one or more than two linear motors may be provided depending upon the amount of force required to effect friction bonding.

Figure 4:
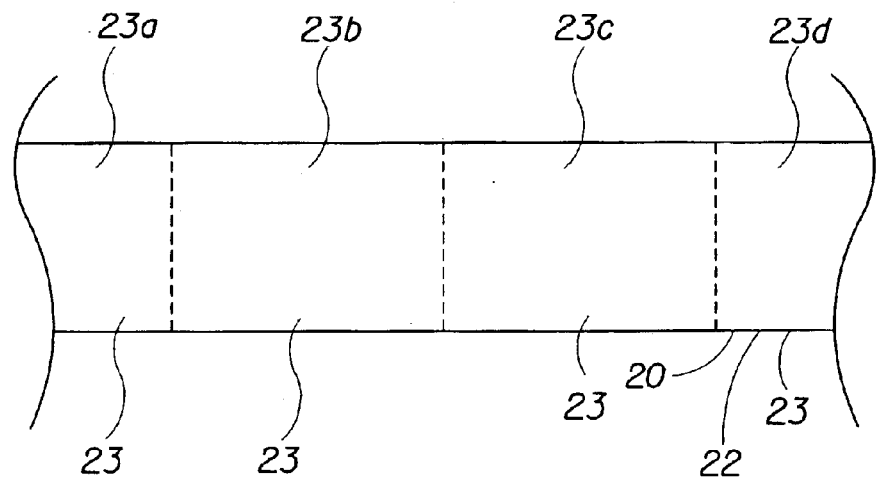
FIG. 4 is a view of four workpiece sections within first and second workpiece layers.

In the illustrated embodiment, each first layer 20 is superposed over its corresponding second layer 22. The first and second layers 20 and 22 may comprise separate workpieces. The superposed layers 20 and 22 include a plurality of sequential workpiece sections 23, see FIG. 4, extending along the entire length of the superposed layers 20 and 22. In FIG. 4, four sequential workpiece sections 23a–23d are illustrated, with the sections 23 being defined by dotted lines. In practice, the workpiece sections 23 may be visually apparent to an operator such as being defined by score lines, lines of indicia, or other visible attributes on the web. Alternatively, the sequential workpiece sections 23 may not be visually apparent to an operator during a friction bonding operation. In either case, the sections 23 may be separated from one another at appropriate locations during a subsequent cutting operation so as to define separate friction-bonded products. It is also contemplated that a first workpiece layer may be laterally offset relative to one or more other workpiece layers such that portions of the two or more layers are overlapped and that only parts of the overlapping portions of the two or more layers are friction bonded together. It is further contemplated that a first portion of a single workpiece may be folded over onto a second portion of that same workpiece to form two superposed portions and that only parts of the two superposed portions are friction bonded together via a rotatable element 32a, 32b and the anvil roll 52. In this instance, the two superposed portions of the single workpiece comprise first and second workpiece layers.

In the illustrated embodiment, the control system 90 comprises a motor controller 92 which generates an analog force signal for each motor 82, 84, varying, for example, between +10 VDC and –10 VDC, where +10 VDC represents the maximum force each motor 82, 84 can generate in a first direction, 0 VDC represents approximately 0 force, and –10 VDC represents a maximum force each motor 82, 84 can generated in a second direction opposite to the first direction. The analog force signals are received by signal-to-power converters 94a and 94b, e.g., amplifiers, which generate, in response to those force signals, corresponding levels of motor power for the linear motors 82 and 84.

The motor controller 92 comprises a memory unit 92a for storing one or more cam look-up tables, discussed further below, a processor 92b and first and second digital-to-analog converters 92c, 92d. The processor 92b receives inputs from a pulse generator 96a, an operator phase reference adjust control 96b and an operator force reference adjust control 96c.

Figure 3:
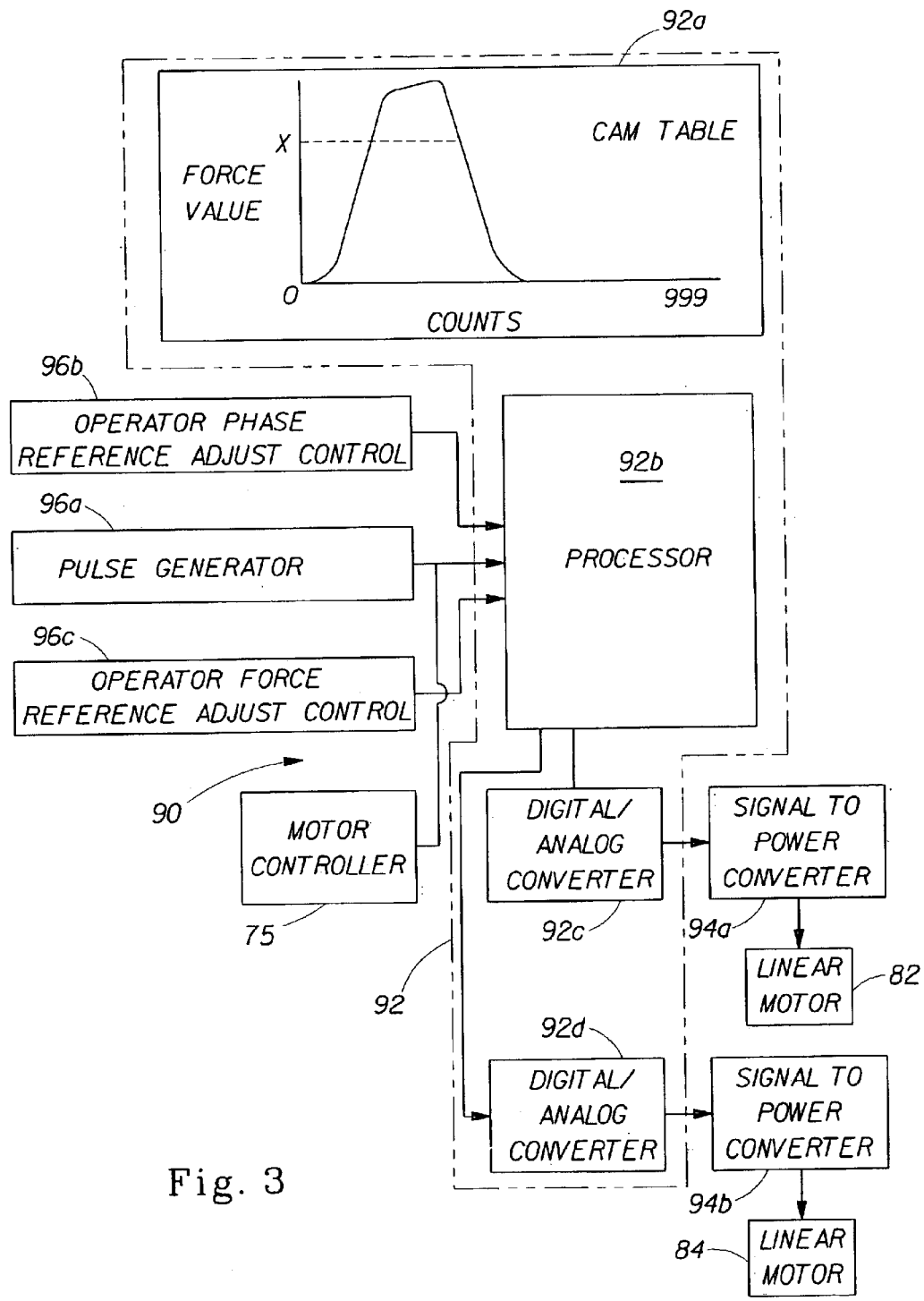
FIG. 3 is a schematic illustration of a control system for the servo motor apparatus illustrated in FIG. 1.
Figure 3A:
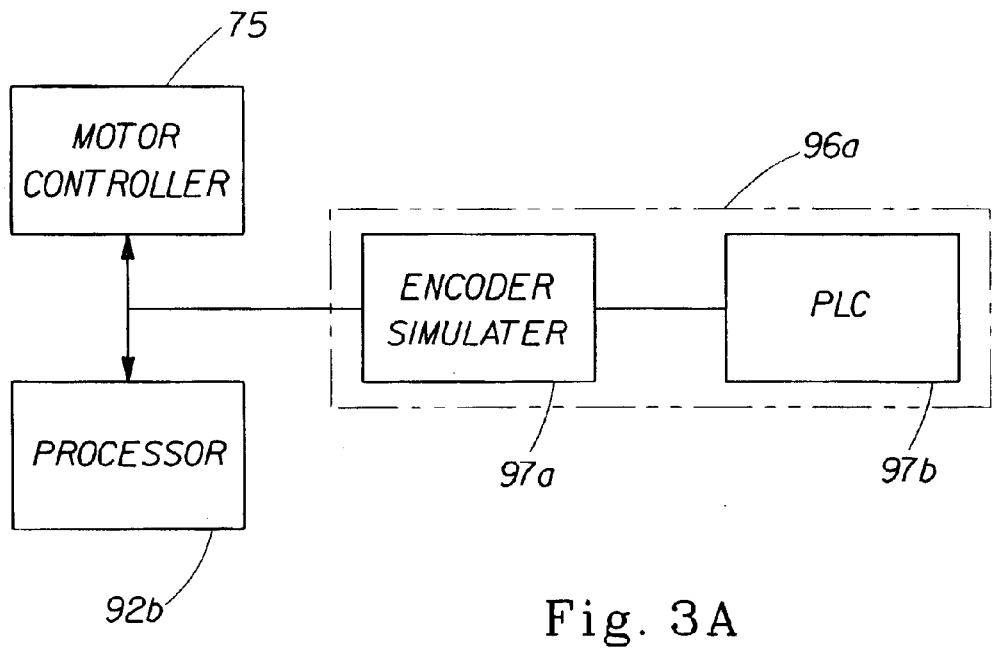
FIG. 3A is a block diagram illustrating a pulse generator.

The pulse generator 96a comprises, in the illustrated embodiment, an encoder simulator 97a, see FIG. 3A, which is commercially available from Rockwell International under the product designation "4100-ESRS." The encoder simulator 97a is driven by a programmable logic controller 97b, which is commercially available from Rockwell International under the product designation "1785-L40C15." Pulses generated by the encoder simulator 97a are provided to the processor 92b, which counts the pulses as discussed below. The programmable logic controller 97b is programmed to control the encoder simulator 97a such that the frequency of its pulses gradually increases from 0 to a steady-state value during ramp-up of the friction bonding apparatus 10 and, when the bonding process is to be discontinued (typically after a plurality of workpiece sections 23 have passed through each nip 60) and the friction bonding apparatus 10 is to be stopped, gradually decreases the frequency of the pulses from the encoder simulator 97a from the steady-state frequency value down to 0. As noted below and presuming that the speed of the motor 72 remains constant, the steady-state frequency value varies with workpiece section pitch, wherein "workpiece section pitch" is the distance between center points on two sequential workpiece sections 23. It is also contemplated that the pulse generator 96a may comprise a conventional encoder or resolver coupled to an output shaft of the motor 72 or other apparatus coupled to or positioned adjacent to the friction bonding apparatus 10.

The pulses generated by the encoder simulator 97a are also provided to the motor controller 75, which, in response to the pulses, drives the motor 72 at the constant motor speed in synchronism with the frequency of the pulses generated by the encoder simulator 97a. In response to an operator providing the programmable logic controller 97b with a new workpiece section pitch, the controller 97b varies the frequency at which the encoder simulator 97a generates pulses. The steady-state frequency of the pulses generated by the encoder simulator 97a is configured such that a predefined number of pulses are generated for each workpiece section 23 passing through a nip 60. If the speed of the motor 72, and hence the speed of the workpiece sections 23 passing through each nip 60, are to remain constant, i.e., the same before the change, as is typical, the response of the motor controller 75 changes to the change in the pulse frequency, as discussed below, to maintain the constant speed. Hence, the steady-state frequency of the pulses generated by the encoder simulator 97a varies based on workpiece section pitch. For example, if workpiece section pitch is doubled, the frequency of the pulses generated by the encoder simulator 97a is halved. Further, because the speed of the motor 72 typically stays constant, the velocity of the workpiece sections 23 moving through each nip 60 remains constant.

The motor controller 75 is programmed to rotate the shaft of the motor 72 one complete revolution while counting a predefined number of pulses generated by the encoder simulator 97a, wherein the predefined number of pulses per motor shaft revolution varies based on workpiece section pitch. When a new pitch is provided to the controller 97b, it communicates the new pitch to the motor controller 75. As alluded to above, the motor controller 75 is programmed to vary the number of pulses its counts per motor shaft revolution in accordance with the new pitch. More specifically, the motor controller 75 is programmed to select the number of pulses it counts per motor shaft revolution corresponding to the new pitch such that the speed of the motor 72 remains constant in response to a workpiece section pitch change. For example, if workpiece section pitch is doubled, the motor controller 75 will rotate the shaft of the motor 72 the same distance that it did before for a count of Y pulses while counting half as many pulses, Y/2 pulses, from the encoder simulator 97a. Hence, while the frequency of the pulses generated by the encoder simulator 97a varies with workpiece section pitch, the velocity of the motor 72 typically remains constant for all workpiece section pitches.

The processor 92b is programmed to function as a counter. That is, the processor 92b counts pulses received from the pulse generator 96a so as to generate counts from 0 to a predefined maximum count value, e.g., 999, at the frequency of the pulses generated by and received from the pulse generator 96a. The processor 92b further functions to repeatedly restart the counting process after reaching the maximum count value until it no longer receives pulses from the pulse generator 96a or is deactivated. In the illustrated embodiment, the number of pulses counted by the processor 92b is constant for all workpiece section lengths and workpiece section pitches. That is, for each workpiece section 23 moving through a nip 60, the processor 92b will count from 0 to 999. Hence, the steady-state frequency of the pulses generated by pulse generator 96a is configured such that a single workpiece section 23 passes through a nip 60 during each count from 0 to 999.

Stored in the memory unit 92a are one or more cam look-up tables, each having values corresponding to a specific force profile or curve of force values vs. counts generated by the processor 92b, one of which is illustrated in FIG. 3. The force values vs. counts curve may have a generally parabolic shape, as illustrated in FIG. 3, or comprise other shapes such as a shape defined by a plurality of generally parabolic curves, a shape defined by one or more square waves, or any other shape which defines the location and length of one or more desired friction bonded portions on a workpiece section. During a friction bonding operation, the linear motors 82 and 84 generate forces upon the force transfer plate 100 in accordance with one or more force profiles corresponding to the workpiece sections 23 passing through the nips 60. Typically, the same force profile is used for each of a plurality of workpiece sections 23. However, it is contemplated that two or more workpiece sections 23, forming part of the same continuous length of superposed workpiece layers 20 and 22, e.g., two sequential workpiece sections 23, may have different force profiles.

During operation of the apparatus 10, the processor 92b repeatedly counts from 0 to 999, wherein each counting sequence from 0 to 999 corresponds to one workpiece section cycle, i.e., a pair of workpiece sections 23 simultaneously passing through the two nips 60. The processor 92b further retrieves from the memory unit 92a, for each workpiece section cycle, force values stored in the force profile look-up table corresponding to the pair of workpiece sections 23 simultaneously passing through the two nips 60. One or more friction bonded portions are created on each workpiece section 23 in accordance with the corresponding force profile. For example, for the force profile illustrated in FIG. 3, a friction bonded portion may be formed during the counts corresponding to the force values equal to or exceeding force value X. If the same force profile look-up table is used for each workpiece section cycle, the processor 92b repeatedly retrieves each of the force values stored in the look-up table corresponding to the counts of 0 to 999 for each workpiece section cycle.

In the FIG. 3 embodiment, no sensor is provided for sensing when a predefined portion of each workpiece section 23 passes through or is about to pass through a nip 60. However, as will be discussed further below, if an operator visually determines that the friction bonded portions are incorrectly positioned on the workpiece sections 23, the operator may vary the location where the bonded portions are formed via the phasing reference adjust control 96a.

Two or more-force profiles may be stored in the memory unit 92a corresponding to different workpiece section lengths and pitches. Workpiece section length generally equals workpiece section pitch. It is also contemplated that different force profiles may be stored for workpiece sections having the same length. For example, different force profiles may be provided when each of a plurality of first workpiece sections is to include a bonded portion of a first length which extends from a first location relative to a workpiece section leading edge and each of a plurality of second workpiece sections is to include a bonded portion of a second length which extends from a second location relative to the leading edge, and the first bonded portion length does not equal the second bonded portion length and/or the first and second locations are not spaced the same distance from the leading edge. Different profiles may also be provided if a different number of portions, e.g., one or two portions, within various workpiece sections are to be bonded.

Each look-up table may store for each count (0–999) generated by the processor 92b a corresponding force value. Hence, during operation, the processor 92b, upon generating a new count, retrieves from memory 92a a corresponding force value. That value, which, as illustrated, comprises a digital number, is provided to each of the two digital-to-analog converters 92c, 92d, which convert the digital number to a corresponding analog force signal, which, as noted above, may have a value between about −10VDC to about +10VDC. The analog force signals are provided to the signal-to-power converters 94a, 94b, which, in response, generate corresponding levels of motor power for the linear motors 82 and 84 causing each motor 82, 84 to generate a corresponding force upon the force transfer plate 100. It is preferred that each linear motor 82 and 84 generate the same force to the transfer plate 100. If, however, different forces are desired, separate look-up tables may be provided for each motor such that separate force values corresponding to the two motors 82 and 84 are retrieved from memory for each count.

It is also contemplated that each look-up table may store only a limited number of force values at corresponding count values. For the count values for which no corresponding force value is stored, the processor 92b determines a force value by interpolating between the nearest two force values, i.e., the provided force values for the nearest two counts.

It is further contemplated that only a single digital-to-analog converter and a single signal-to-power converter may be provided. In such a case, the processor 92b, upon generating a new count, retrieves from memory 92a a corresponding force value. That value, which comprises a digital number, is provided to the single digital-to-analog converter, which converts the digital number to a corresponding analog force signal, which, as noted above, may have a value between about −10VDC to about +10VDC. The analog force signal is provided to the single signal-to-power converter, which, in response, generates corresponding levels of motor power for each linear motor 82 and 84.

Friction bonding is effected once the pressure applied by a rotatable element 32a, 32b and the anvil roll 52 to the corresponding workpiece layers 20, 22 exceeds a given threshold value. If an operator determines, such as by visual inspection, that the friction bonds (i.e., friction bonded portions) formed by the rotatable elements 32a and 32b and the anvil roll 52 are incorrectly located on the workpiece sections 32, the operator may change the phase or timing as to when the friction bonds are formed by the rotatable elements 32a, 32b and the anvil roll 52. For example, an operator may visually inspect one or more workpiece sections 23 after those sections have been cut or otherwise separated from the superposed layers 20 and 22 and measure the distance where a point on a friction bonded portion, i.e., a leading edge of the bonded portion, is located relative to a leading or trailing edge of the workpiece section 23. An operator effects a phase change via the operator phasing reference adjust control 96b.

The processor 92b, in response to receiving a phase change signal from the adjust control 96b, advances or retards its count of the pulses generated by the pulse generator 96a, typically for only a single workpiece section cycle. For example, if the location of a bonded portion needs to be moved towards the leading edge of a workpiece section 23 and the leading edge passes through the nip 60 followed by the trailing edge, an operator may input a value into the adjust control 96b causing the processor 92b to advance its count of pulses (0–999) and retrieve certain force values earlier than normal, e.g., a force value corresponding to count 4 which was previously retrieved by the processor 92b after it had counted five pulses may be retrieved by the processor 92b after it has counted only one pulse. That is, the processor 92b advances its count directly to count 4 by skipping counts 0–3. Conversely, if the location of a bonded portion needs to be moved away from the leading edge of a workpiece section 23, the operator may input a value into the adjust control 96b causing the processor 92b to delay its count of pulses (0–999) so as to retrieve certain force values later than normal, e.g., a force value corresponding to count 4 which was previously retrieved by the processor 92b after it had counted five pulses may be retrieved by the processor 92b after it has counted ten pulses. That is, the processor 92b delays the initiation of its counting sequence of 0 to 999 for five pulses such that on the sixth pulse it generates count 0.

Typically, the processor 92b will advance or retard its count of the pulses generated by the pulse generator 96a for a single workpiece section cycle, such that all subsequent workpiece sections 23 processed during subsequent workpiece section cycles will have friction bonded portions correctly formed and positioned thereon after the phase change operation for the single workpiece section cycle has been effected.

It is also contemplated that a conventional electronic vision system or other optical system may be provided to sense the location of the friction bonded portions on the workpiece sections 23 and, in response, generate a location signal to the processor 92b. The processor 92b, in response to receiving the location signal, will advance or retard its count of the pulses generated by the pulse generator 96a to change the position of where the bonded portions are formed on the workpiece sections 23 such that the bonded portions are formed at desired locations on the workpiece sections 23.

The operator force reference adjust control 96c allows an operator to enter a new scaling value so as to multiply each force value retrieved from a look-up table by a new scaling factor. Hence, if the operator determines that insufficient bonds are being created by the rotatable elements 32a, 32b and the anvil roll 52, the operator may increase the value of the adjust control 96c causing the processor 92b to increase a scaling factor (which is nominally equal to 1), e.g., multiply each force value it retrieves from the look-up table by an increased scaling factor. Conversely, if an operator determines that the compressive pressures applied to the workpiece sections 23 are too great, such that the workpiece layers are being damaged, the operator may decrease the value of the adjust control 96c causing the processor 92b to decrease the scaling factor, e.g., multiply each force value it retrieves from the look-up table by a value less than one. Alternatively, instead of multiplying each force value by a new scaling factor, the processor 92b may add predefined values to or subtract predefined values from each force value so as to vary the pressure applied by the rotatable elements 32, 32b and the anvil roll 52 to the workpiece layers during friction bonding.

It is further contemplated that the processor 92b may be programmed to vary the force values retrieved from a look-up table during speed ramp-up or ramp-down. It is known that the amount of pressure required to effect a friction bond decreases as the speed of the workpiece layers increases. Hence, the processor 92b may be programmed to multiply predefined force values by one or more predefined values, during process speed ramp-up and/or ramp-down. Alternatively, the processor 92b may add predefined values to predefined force values during process speed ramp-up and/or ramp-down. It is additionally contemplated that the processor 92b may be programmed to vary the force values retrieved from a look-up table to account for wear of the tooling, i.e., wear of the patterned tools 46 and anvil roll 52, over time. Hence, the processor 92b may be programmed to track the number of hours the tooling has been in use and, after a predefined period of time has expired, scale, e.g., multiply, the force values retrieved from the look-up tables by a predetermined value or add a predefined value to the force values.

In an alternative embodiment, it is contemplated that a sensor (not shown) may be provided for sensing a score line or other indicia on one or more workpiece sections 23 corresponding to a predefined location on the one or more workpiece sections 23, such as the leading or trailing edge, so as to initiate each recurring counting process by the processor 92b. Hence, the processor 92b can initiate its recurring counting operation in synchronism with the sensing of a predefined location on the workpiece sections 23, i.e., the leading edge. Accordingly, friction bonding will be effected at the proper time resulting in one or more predetermined portions of each workpiece section 23 being friction bonded.

It is contemplated that a friction bonding apparatus constructed in accordance with the present invention can form friction bonded portions within workpiece sections 23 having generally any length, but preferably a length of from about 6 inches to about 30 inches, including all ranges subsumed therein, and more preferably having a length of from about 10 inches to about 30 inches, and wherein a predefined force profile is repeated for the workpiece sections passing through the nip at a rate of from about 1 to about 1200 workpiece sections per minute, including all ranges subsumed therein, and preferably from about 50 to about 1200 workpiece sections per minute and, more preferably, from about 200 to about 1200 workpiece sections per minute.

It is also contemplated that sensors 82d, 84d, e.g., encoders, for sensing the position of each piston 82a, 84a may be provided. However, the feedback signals from the sensors are typically only used for maintenance purposes to sense when the pistons are raised sufficiently to allow the rotatable elements 32a, 32b to be raised or to sense vibrations of the rotatable elements 32a, 32b and the roll 52 to verify operation of the apparatus 10.

The control system 90 functions without requiring feedback from sensors detecting the forces generated by the motors 82, 84.

It is also contemplated that springs (not shown) may be provided between the bearing plates 40 and the fixed housing 42 to assist in moving the rotatable elements 32a, 32b away from the anvil roll 52.

It is further contemplated that an operator may change the rate at which friction-bonded products are generated by the apparatus 10 by providing a new friction-bonded product/unit time production rate to the logic controller 97b. In response, the logic controller 97b proportionally varies the frequency at which the encoder simulator 97a generates pulses. While changes in the number of pulses corresponding to one motor revolution can be made for given situations, such a change is not necessary. For example, the motor controller 75 may count the same number of pulses per motor shaft revolution in response to the changed production rate. In that event, if the frequency at which the encoder simulator 97a generates pulses doubles, the speed of the motor 72 doubles causing the rate at which friction-bonded products are generated by the apparatus 10 to double as well.

EXAMPLE

A friction bonding apparatus was constructed having a pair of rotatable elements 32a, 32b positioned above an anvil roll 52. First and second linear servo motors 82 and 84 were provided, which motors were purchased from California Linear Device of Carlsbad, Calif. under the product designation "Model No. 5020-6." The force profile, i.e., force values as a function of counts, for each workpiece section had the same square-wave shape. The force values retrieved from the memory 92a by the processor 92b were provided to the digital-to-analog converters 92c, 92d which, in turn, converted the force values into analog force signals. Motor power for the motors 82 and 84 was generated by the signal-to-power converters 94a, 94b in response to receiving the analog force signals from the digital-to-analog converters 92c, 92d. The apparatus was operated at a rate up to 1200 cycles/minute, i.e., 1200 workpiece sections passed through each nip per minute, with each workpiece section having a length of about 410 mm. Two workpiece layers were used, with the combined thickness of the workpiece layers being about 0.23 mm. A single bonded portion of 70 mm was formed on each workpiece section. Bonded portions, each having a length of 70 mm ±1 mm, were formed during operation at a processing rate of 600 cycles/minute. Bonded portions of 70 mm +5 mm were formed during operation at a processing rate of 1200 cycles/minute. The decrease in the accuracy of bonded portion lengths was believed to be due to the low composite spring constant of the workpiece layer materials.

What is claimed is:

1. Apparatus for dynamically bonding plural workpiece layers together, said apparatus comprising:

a first assembly including a rotatable element having an outer circumferential portion adapted to engage one of said workpiece layers;

a second assembly including an anvil roll adapted to engage another of said workpiece layers and defining with said rotatable element a nip for receiving said workpiece layers;

a drive mechanism for effecting rotation of said rotatable element and said anvil roll;

servo motor apparatus for applying a predefined force to at least one of said rotatable element and said anvil roll so as to bias said rotatable element and said anvil roll together; and a control system coupled to said servo motor apparatus for varying the force applied by said servo motor apparatus to said at least one of said rotatable element and said anvil roll such that said outer circumferential portion of said rotatable element and said anvil roll bond together predefined portions of said plural workpiece layers passing through said nip.

2. Bonding apparatus as set forth in claim 1, wherein said rotatable element comprising a support roll, a mounting ring coupled to said support roll and a patterned tool coupled to said mounting ring, said patterned tool defining said outer circumferential portion of said rotatable element.

3. Bonding apparatus as set forth in claim 1, wherein said plural workpiece layers define sequential workpiece sections, and said control system generates, for each workpiece section, control signals to said servo motor apparatus varying the force applied by said servo motor apparatus to said at least one of said rotatable element and said anvil roll according to a corresponding predefined force profile.

4. Bonding apparatus as set forth in claim 3, wherein said predefined force profile is substantially the same for two sequential workpiece sections.

5. Bonding apparatus as set forth in claim 3, wherein said predefined force profile is different for two sequential workpiece sections.

6. Bonding apparatus as set forth in claim 3, wherein said control system generates, for one or more given workpiece sections, control signals to said servo motor apparatus to initiate application of force to said at least one of said rotatable element and said anvil roll in accordance with a corresponding force profile based on a count of pulses.

7. Bonding apparatus as set forth in claim 6, wherein said control system permits an operator to change the count of said pulses so as to vary the timing as to when forces are applied to said at least one of said rotatable element and said anvil roll in accordance with said force profile.

8. Bonding apparatus as set forth in claim 3, wherein said predefined force profile is defined by a parabolic curve.

9. Bonding apparatus as set forth in claim 3, wherein said predefined force profile is substantially the same for each of a predetermined plurality of sequential workpiece sections.

10. Bonding apparatus as set forth in claim 9, wherein said control system permits an operator to scale the force profile upward or downward.

11. Bonding apparatus as set forth in claim 9, wherein said control system varies the force profile based on wear of at least one of said rotatable element and said anvil roll.

12. Bonding apparatus as set forth in claim 3, wherein each workpiece section has a length from about 10 inches to about 30 inches and said control system generates control signals for each workpiece section so as to repeat a force profile for sequential workpiece sections passing through the nip at a rate equal to or greater than 50 workpiece sections per minute.

13. Bonding apparatus as set forth in claim 1, wherein said control system varies the force applied by said servo motor apparatus to said at least one of said rotatable element and said anvil roll during process speed ramp-up and ramp-down.

14. A method of dynamically bonding together predefined portions of sections of plural workpiece layers comprising the steps of:

providing a rotatable element having an outer circumferential portion and an anvil roll, said rotatable element and said anvil roll defining a nip;

rotating said rotatable element and said anvil roll;

applying a predefined force to at least one of said rotatable element and said anvil roll so as to pressure bias said rotatable element and said anvil roll together;

passing the plural workpiece layers through said nip; and varying the force applied to said at least one of said rotatable element and said anvil roll for each workpiece section of the plural workpiece layers according to a corresponding predefined force profile, said force profile for each workpiece section causing said outer circumferential portion and said anvil roll to bond together layers of at least one predefined portion of the workpiece section as said predefined portion passes through said nip.

15. The method as set forth in claim 14, wherein said predefined force profile is different for two sequential workpiece sections.

16. The method as set forth in claim 14, further comprising, for one or more given workpiece sections, the step of initiating the application of force to said at least one of said rotatable element and said anvil roll in accordance with a corresponding force profile based on a count of pulses.

17. The method as set forth in claim 16, further comprising the step of changing the count of said pulses so as to vary the timing as to when forces are applied to said at least one of said rotatable element and said anvil roll in accordance with said force profile.

18. The method as set forth in claim 14, wherein said predefined force profile is substantially the same for each of a predetermined plurality of sequential workpiece sections.

19. The method as set forth in claim 18, further comprising the step of scaling the force profile upward or downward based on the wear of at least one of said rotatable element and said anvil roll.

20. The method as set forth in claim 14, wherein each workpiece section has a length from about 10 inches to about 30 inches and a predefined force profile is repeated for sequential workpiece sections passing through the nip at a rate equal to or greater than 50 workpiece sections per minute.

* * * * *

UNITED STATES PATENT AND TRADEMARK OFFICE
CERTIFICATE OF CORRECTION

PATENT NO.  : 6,733,605 B1
DATED       : May 11, 2004
INVENTOR(S) : Michael J. Lamping et al.

It is certified that error appears in the above-identified patent and that said Letters Patent is hereby corrected as shown below:

Column 5,
Line 52, delete "workpiece,section" and insert -- workpiece section --.

Column 6,
Line 34, delete "more-force" and insert -- more force --.

Signed and Sealed this

Twenty-fourth Day of January, 2006

JON W. DUDAS
*Director of the United States Patent and Trademark Office*